(12) United States Patent
Witteveen

(10) Patent No.: US 7,075,212 B2
(45) Date of Patent: Jul. 11, 2006

(54) PIEZOELECTRIC MOTOR

(75) Inventor: Bonny Witteveen, Venlo (NL)

(73) Assignee: Miniswys AG, Bienne (CH)

( * ) Notice: Subject to any disclaimer, the term of this patent is extended or adjusted under 35 U.S.C. 154(b) by 215 days.

(21) Appl. No.: 10/493,135

(22) PCT Filed: Oct. 18, 2002

(86) PCT No.: PCT/CH02/00568

§ 371 (c)(1),
(2), (4) Date: Jun. 7, 2004

(87) PCT Pub. No.: WO03/036786

PCT Pub. Date: May 1, 2003

(65) Prior Publication Data

US 2005/0006983 A1 Jan. 13, 2005

(30) Foreign Application Priority Data

Oct. 22, 2001 (CH) .................................... 1936/01

(51) Int. Cl.
*H02N 2/00* (2006.01)
(52) U.S. Cl. .................. 310/323.02; 310/328
(58) Field of Classification Search ...............
310/323.01–323.03, 323.05, 323.06, 323.13,
310/323.17, 328
See application file for complete search history.

(56) References Cited

U.S. PATENT DOCUMENTS

| | | | |
|---|---|---|---|
| 4,453,103 A | 6/1984 | Vishnevsky et al. | |
| 4,814,660 A | 3/1989 | Yamada et al. | |
| 4,831,306 A | 5/1989 | Staufenberg et al. | |
| 4,884,002 A | 11/1989 | Eusemann et al. | |
| 4,959,580 A | 9/1990 | Vishnevsky et al. | |
| 5,063,321 A * | 11/1991 | Carter .................... | 310/323.17 |
| 5,087,851 A | 2/1992 | Nakazawa et al. | |
| 5,134,334 A | 7/1992 | Onishi et al. | |
| 5,146,129 A | 9/1992 | Tamura et al. | |
| 5,162,692 A | 11/1992 | Fujimura | |
| 5,191,688 A | 3/1993 | Takizawa et al. | |
| 5,200,665 A | 4/1993 | Iijima | |
| 5,216,313 A | 6/1993 | Oshinishi et al. | |
| 5,296,776 A | 3/1994 | Wind et al. | |
| 5,378,948 A * | 1/1995 | Richter .................... | 310/328 |
| 5,561,337 A | 10/1996 | Toda | |
| 5,705,878 A * | 1/1998 | Lewis et al. ............... | 310/328 |
| 6,064,140 A | 5/2000 | Zumeris | |
| 6,188,161 B1 | 2/2001 | Yoshida et al. | |
| 6,201,339 B1 | 3/2001 | Tani et al. | |
| 6,242,846 B1 | 6/2001 | Ashizawa et al. | |
| 6,266,296 B1 * | 7/2001 | Miyazawa .................. | 368/28 |

(Continued)

FOREIGN PATENT DOCUMENTS

EP      0 963 033 A1    12/1999

(Continued)

*Primary Examiner*—Thomas M. Dougherty
(74) *Attorney, Agent, or Firm*—Rankin, Hill, Porter & Clark LLP

(57) ABSTRACT

A piezoelectric drive (1) with an inner part (2) that is surrounded by an outer part (3). The inner part (2) includes at least one piezoelement (9) that is actively connected to an oscillation element (5). The oscillation element (5) has a middle part (6) about which at least one arm (7, 15) is arranged. The arm is actively connected to the outer part (3) via an interaction region (16) and is designed such that, when set into oscillation by way of the at least one piezoelement (9), it drives the outer part (3) relative to the inner part (2).

12 Claims, 5 Drawing Sheets

U.S. PATENT DOCUMENTS

| | | |
|---|---|---|
| 6,323,578 B1 | 11/2001 | Suzuki et al. |
| 6,867,532 B1 * | 3/2005 | Brady et al. ........... 310/323.02 |
| 6,979,936 B1 * | 12/2005 | Ganor et al. ................ 310/328 |
| 2003/0052575 A1 | 3/2003 | Mock et al. |
| 2005/0127784 A1 * | 6/2005 | Witteveen ................... 310/328 |

FOREIGN PATENT DOCUMENTS

| | | |
|---|---|---|
| EP | 1075079 A1 | 2/2001 |
| JP | 61-240865 | 10/1986 |
| JP | 02-046178 * | 2/1990 |
| JP | 6-189569 | 7/1994 |
| JP | 11052075 | 2/1999 |
| SU | 1820820 | 10/1990 |
| WO | WO 92/10874 | 6/1992 |
| WO | WO 98/43306 | 10/1998 |

* cited by examiner

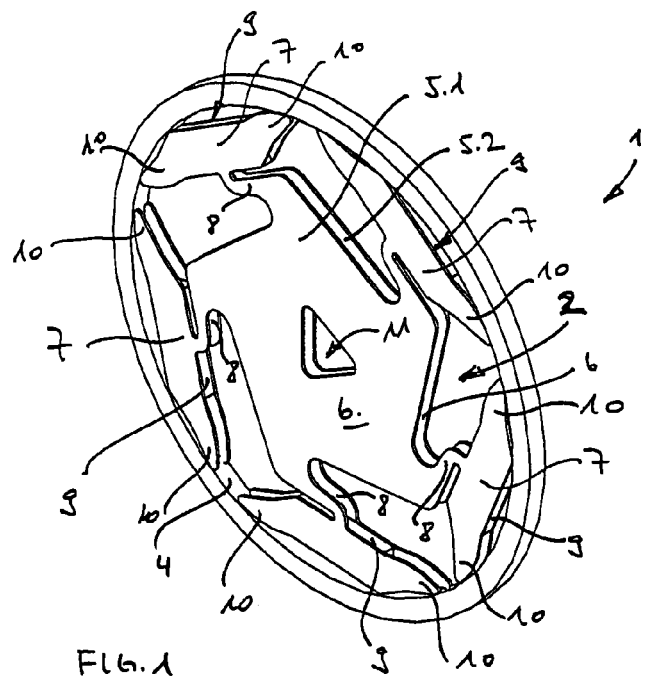
FIG. 1
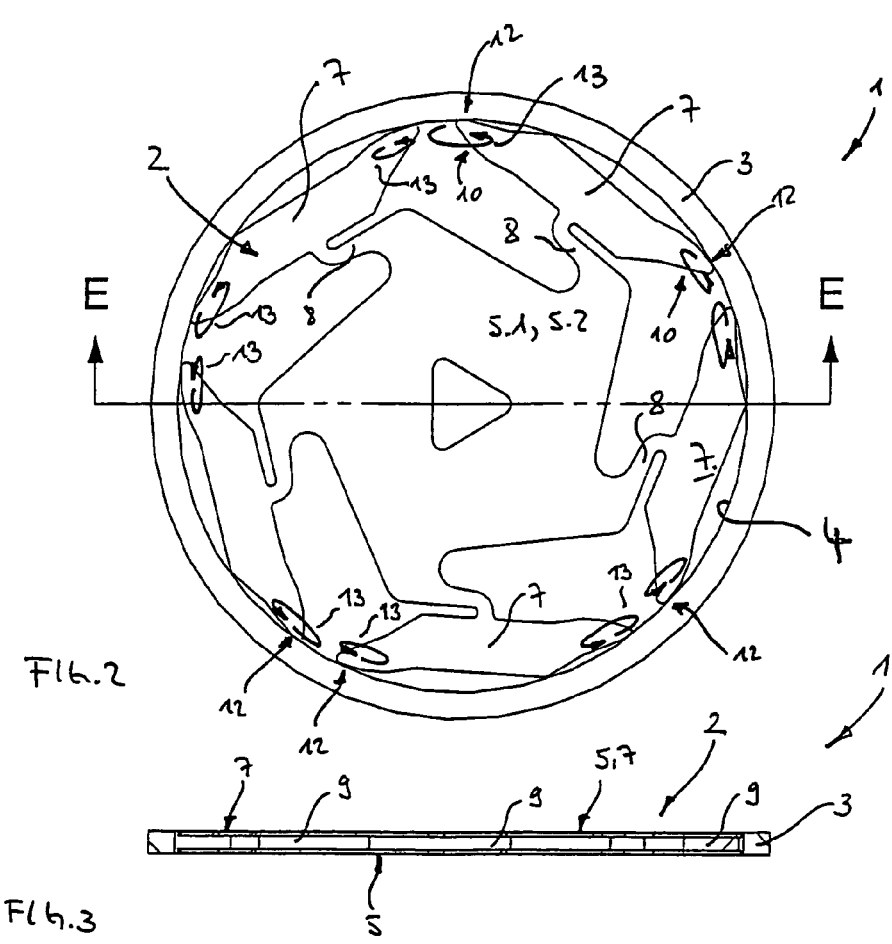
FIG. 2
FIG. 3

PIEZOELECTRIC MOTOR

BACKGROUND OF THE INVENTION

The invention relates to a piezoelectric drive having an inner part and an outer part, wherein the inner part has a piezoelement and an oscillation element that cooperate to drive the outer part relative to the inner part.

Piezoelectric drives, that is to say drives by way of piezoceramic materials which may be mechanically changed by an electrical voltage field are suitable in particular for miniaturized applications, for example for motors with a motor volume of a magnitude of a few cubic centimeters or even with a volume which is smaller than one cubic centimeter. Further advantages of these drives are a high moment at low speeds, a simple controllability, a smooth running, a relatively simple construction and their insensitivity with regard to external magnetic fields as well as the fact that they themselves produce no magnetic fields.

Piezoelectric drives of the so-called standing-wave type as a driving element comprise at least one resonator which usually consists of a piezoelement and a resonance body (horn) mechanically coupled to the piezoelement, wherein the piezoelement and the resonator body are matched to one another and the piezoelement driven, in a manner such that the resonator oscillates in a standing wave. The horn comprises a tapering free end which points away from the piezoelement and which advantageously lies on a point of the greatest oscillation amplitude. It has been shown that such horn tips, if they are pressed in a suitable manner against a movable body, may drive the body in a directed manner, wherein the force transmission is essentially based on a friction fit.

Such a drive is described in "Piezoelectric Actuators and Ultrasonic motors" of Kenji Uchino (Kluwer Academic publishers, Boston, Dordrecht, London 1997). This drive comprises a pair of disk-like piezoelements arranged coaxially over one another which are operated polarized in opposite directions in a 3,3 mode. A horn connects essentially coaxially to the piezoelements. The horn tip is pressed against the surface of a body which is movably arranged parallel to this surface. It has been shown that the body may be driven in a directed manner with the help of the horn if the axis of the horn is not directed exactly perpendicularly towards the surface but forms a small, acute angle with the perpendiculars to the surface. If the resonator arranged in such a manner is operated at a resonant frequency, it drives the body in that direction in which the slightly oblique horn tip points. The induced, directed movement of the driven body is explained by the elliptical oscillations of the horn tip in a plane perpendicular to the surface of the body. A reversal of the movement direction is achieved by a re-orientation of the resonator axis.

A similar piezomotor is described in the publication DE-3920726 (Olympus Optical). In place of the resonator of the motor described briefly above, which is symmetrical relative to its axis, the motor according to DE-3920726 comprises an asymmetrical horn whose tapering end does not lie on the resonator axis. The resonator is arranged with the axis directed perpendicularly to the surface of the body to be driven, and with a suitable shaping of the horn tapering towards the horn tip, causes a directed movement of the body. At the same time, there are oscillation conditions at frequencies different from one another which produce movements in opposite directions. The movement direction may, thus, be set via the frequency driving the piezoelements. The drive is suggested for application as a linear drive or as a rotational drive, wherein the resonator axis is aligned perpendicular to an end-face of the rotor (axially) or perpendicular to the outer surface of the rotor (radially). The motor exhibits a large wear.

The piezoelectric drive according to DE-3920726 may be realized with relatively simple means as a rotation motor with an end-face drive. In the embodiment with the end-face drive it is also possible with simple means to mutually preload the rotor and resonator. It is particularly with regard to piezoelectric drives having an axially directed resonator axis that miniaturization limits arise, and one would like to go beyond these limits.

For motors which are to be very flat in the axial direction, it is therefore suggested (e.g. in EP-0505848, ETA SA) to use a centrally arranged, circular-disk-shaped piezoelement which may be driven in a planar mode. This piezoelement is coupled to a flat resonance body which is arranged coaxially to the piezoelement and which comprises a plurality of asymmetrical horn tips extending radially towards an outer ring. Driven by the piezolements, the horn tips again oscillate in elliptical movements by way of which the outer ring is rotatingly moved about the resonator in a directed manner. The described drive although being able to be designed very thin in the axial direction, is however always an inner runner. A preloading between the resonance body and the outer ring is not possible so that the drive reacts very sensitively to wear on the horn tips and the force able to be transmitted by friction remains limited.

The piezoelectric drives known from the state of the art are not suitable or hardly suitable for a drive of the type "outer runner" with which the inner part of the motor remains stationary and the outer part is driven. Conventional motors act primarily perpendicular to a surface to be driven, which entails much wear and a short serviceable life.

It is then the object of the invention to provide a piezoelectric drive of the type "outer runner" which consists of few parts, is simple to realize and is suitable for drives of different size and power.

This object is achieved by the piezoelectric drive as is defined by the present invention.

SUMMARY OF THE INVENTION

The piezoelectric drive according to the invention serves for producing a directed, relative rotational movement between an outer part to be driven which surrounds a stationary inner part. Such drives of the type "outer runner" have a large drive moment or holding moment on account of the comparatively large lever arm. Furthermore, they have a large power density on account of the compact construction.

As a rule, outer runners according to the invention comprise an inner part which serves as a force-producing drive element. The inner part acts on an essentially circularly designed inwardly-directed drive surface of an outer part. The outer part may, for example, be an annular or bell-shaped means and be mounted by way of the inner part, or, if required, may have a separate mounting. The inner surface to be driven is preferably shaped in a circularly cylindrical manner.

The inner part to be driven comprises one or more equally acting piezoelements. Each piezoelement is connected to an oscillation element which acts directly or indirectly on the drive surface. The oscillation element is designed in a manner such that it transforms the driving movement of the piezoelement in direction and size and converts it into a suitable drive movement which is transmitted onto the body to be driven. If the oscillation element or the resonator is freely excited as a whole, that is to say without it being actively connected to the body to be driven, the oscillation element executes a characteristic movement at defined locations. This characteristic movement is preferably equal to an ellipse. For a higher drive speed one prefers more of a flat ellipse and for a greater drive force, more of a round one. If the drive region is brought into contact with the body to be driven, the resulting movement changes on account of the interaction with the body to be driven.

The inner part or parts thereof are excited into oscillation by the piezolement or piezoelements. The oscillation frequency as a rule corresponds to a resonant frequency of the inner part. The inner part has a mass distribution which is selected in a manner such that the characteristic movement of the resonator and, thus, the rotational direction of the drive may be determined by way of the selection of the oscillation frequency. It is thus possible for the drive to rotate in one direction, at a first frequency, and in the other direction, at a second frequency. The rotational speed is set via the amplitude of the resonator or influenced by modulation. The drive may also be operated as a stepper motor in that the drive voltage is applied in a pulsed manner.

The oscillation element is preferably manufactured of sheet metal with good oscillation properties (Q-factor). The piezoelement is fastened to the oscillation element by way of adhesive. The module of elasticity (E-module) of the sheet metal and of the piezoelement, or the thickness of the sheet metal and of the piezoelement, is preferably selected such that the following formula is fulfilled as much as possible $$E\text{-module}_{sheet\ metal} * \text{thickness}_{sheet\ metal} = E\text{-module}_{piezoelement} * \text{thickness}_{piezoelement}.$$

With certain embodiments, the influence of the adhesive layer between an oscillation element and a piezolement is to be considered as an elastic intermediate layer. The material of the oscillation element should act in an as low as possible damping manner and have a sufficient mechanical strength. Since the force of the drive according to the invention is transmitted primarily via friction onto the body to be moved, the pairing of the material between the body to be moved and the drive plate is to be selected accordingly. Where appropriate, the interaction region of the resonator region which is in frictional contact with the body to be driven may consist of a material which is more suitable for the force transmission by friction than the remainder of the drive plate, or coated with this material.

The inner part of the drive according to the invention preferably has a star-shaped design with several interaction regions which are actively connected to the drive surface of the outer part to be driven. The inner region comprises one or more piezoelements which coupled to one or more oscillation elements form a resonator or several resonator regions. For driving the outer part, one primarily uses movements which lie in the plane of the oscillation element.

One preferred embodiment of an inner part comprises a central piezoelement which is arranged between two centrically arranged, distanced oscillation elements and is actively connected to these. The oscillation elements consist of an elastic material and each comprise a middle part around which resilient, outwardly directed arms are arranged. These arms are preferably shaped arcuately and run at least in regions roughly tangentially to the drive surface of the outer part. They are in contact with these via interaction regions (i.e. edge regions). The oscillation element with the arms in this embodiment is designed such that the oscillation element, together with the piezoelement, forms a resonator. At the same time, the arms serve as an elastic transmission element between the piezoelement and the body to be driven. The inner part comprises a mounting which is designed in a manner such that the driving oscillation is not negatively influenced. A mechanical decoupling by way of a floating mounting and/or elastic mounting which simultaneously serves for compensating inaccuracies influencing the concentric running are particularly preferred. This may e.g. be realized by way of a rubber element transmitting a torque. The oscillation elements may serve for the electrical activation of the piezoelement.

A further preferred embodiment comprises an oscillation element with several arms arranged around a middle part. Each of these arms comprises a thickened region which is connected to the middle part via a thin location. An exciting piezoelement is attached on the thickened region. The thin locations serve for the elastic mounting of the thickened regions and the piezoelements with respect to the middle part. The middle part, which preferably consists of a planar sheet, forms a rest region on which at least one resonator region is integrally formed (thickened region). The oscillation behaviour of an inner part, which, for example, is manufactured of a sheet plate, may be tuned by way of crimps, reliefs or pressings. A narrow spring region that is resilient in the direction of the two-dimensional extension of the drive plate is arranged between the rest region and the resonator region. A thin, rectangular piezoelement extending parallel to the drive plate and able to be operated preferably in a 3.1 mode is coupled, preferably stuck, on a resonator region at least on the one side of the drive plate. The piezoelement preferably has a length which is larger than its width, wherein its length and its width are significantly larger than its thickness. The surfaces of the piezoelements extending transversely to the thickness are designed as contact surfaces. The longitudinal axis of the piezoelement lies essentially on a longitudinal axis of the resonator region, which, advantageously, has the same width as the piezoelement. In the direction of the longitudinal axis, the resonator region projects beyond the piezoelement at least on a side where it forms a horn with an interaction region, which advantageously tapers asymmetrically to the longitudinal axis. The piezoelement and the resonator region are matched to one another in a manner such that together they form a resonator which by way of polarization of the piezoelement with a high-frequency alternating voltage may be brought into a condition oscillating in a standing wave. The activation of the drive is effected via a frequency generator which forms a unit together with the drive.

The two bodies to be moved relative to one another with the help of the piezoelectric drive according to the invention (of which the first is the oscillation element or is fixedly connected to the rest [idle] region of the oscillation element) are arranged in a manner such that the horn tip of the resonator region is in contact with a drive surface of the outer part. The drive surface is aligned essentially transversely to the drive plate, and specifically such that the slightly preloaded spring region presses the resonator region against the outer part, and such that the longitudinal axes of the piezoelement and the resonator region are directed essentially parallel or tangentially to the movement to be produced. The edge region of the drive plate, which is in contact with the second body (to be driven), is located directly at the horn tip and is advantageously aligned essentially parallel to the longitudinal axes of the piezoelement and resonator region.

Apart from the function of producing a preloading between the two bodies to be moved relative to one another, the spring region of the drive plate also has the task of decoupling the vibration produced by the driven piezolement from the rest region of the drive plate.

It has been shown that the interaction region (horn tip) of such a flat resonator region given excitation by way of the piezoelement at a resonant frequency carries out elliptical movements in the plane of the drive plate from which there results the directed relative movement between the two bodies. It is also shown that there are resonance conditions with a first movement direction and other resonance conditions with a second movement direction, opposite to the first movement direction.

The elliptical movements of the horn tip may be understood as a superimposition of the longitudinal oscillation in the direction of the longitudinal axes of the piezoelement and resonator region with transversal oscillation in the direction of the width of the piezoelement, wherein the transverse oscillation propagates into the horn as bending oscillation. On the other hand, a directed bending oscillation is to be expected by way of an asymmetrical design of the horn.

It is been shown that an arrangement in which the longitudinal oscillation runs essentially parallel to the movement direction (or parallel or tangentially to the surface to be moved) runs more smoothly and at a higher efficiency compared to an essentially perpendicular arrangement according to the state of the art, which may be explained by the weaker impacts perpendicular to the surface to be driven.

If, in each case, an equal piezoelement is coupled on both sides of the resonator region, and the two piezoelements are polarized oppositely to one another, then oscillations of the piezoelement in the direction of its thickness hardly effect the resonator region so that no energy is lost by friction upon movement of the horn tip transversely to the movement direction.

For the electrical polarization of all piezoelements arranged on a drive plate, the drive plate may be exploited as one of the two electrical terminals if the drive plate consists of an electrically conductive material and the piezoelements are assembled thereon with an electrically conducting adhesive. A very simple supply results if two identical drive plates are used and the piezoelements are arranged therebetween and supplied via the two drive plates. With such an embodiment form, one may supply all piezoelements with only two electrical connections to the two electrically conducting drive plates, which, in particular, is advantageous for the smallest designs of the piezoelectric drive. The location of the electrical connections is to be selected such that no negative influencing of the oscillation behavior occurs.

In an embodiment with two drive plates, in order to reduce any occurring oscillation of the horn tips in the direction of the thickness of the drive plate, it is possible to connect the horn tips of each resonator region of the two drive plates to one another via a suitable spacer. This spacer or another suitable element may simultaneously be used for influencing the oscillation behaviour. Furthermore, the friction surface may be increased by way of a spacer.

The drive plate advantageously consists of a good heat-conducting material and is large enough to lead away heat arising on vibration in the piezoelements.

The invention relates to a piezoelectric drive for producing a relative movement in a movement plane between a first body and a second body. This drive comprises at least one piezoelement able to be driven with a high-frequency alternating voltage and a resonator with a horn, said resonator being mechanically coupled to the piezoelement and excitable by the piezoelement in a standing wave. The resonator is actively connected to the first body. One region of the horn may be pressed against a surface of the second body for directed driving.

The drive comprises a drive plate which forms the first body or is fastened on the first body and which is arranged essentially parallel to the movement plane. The drive plate comprises a rest region and at least one resonator region, wherein between the rest region and the resonator region, there is arranged a spring region which is resilient essentially parallel to the plane of the drive plate. A piezoelement is laterally coupled onto the at least one resonator region. The second body may be positioned relative to the drive plate in a manner such that the at least one resonator region with an edge region that lies in the region of the horn is pressed by way of a preloading (bias) of the spring region in a contact region against the surface of the second body, said surface being directed essentially transverse to the plane of the drive plate, so that this second body may be driven essentially parallel to this surface.

BRIEF DESCRIPTION OF THE DRAWINGS

Advantageous embodiments of the piezodrive according to the invention are described in more detail in combination with the following figures. With this there are shown schematically and greatly simplified in:

FIG. 1 shows a first embodiment of a piezoelectric drive,

FIG. 2 shows a plan view of the piezoelectric drive according to FIG. 1;

FIG. 3 shows a section through the piezoelectric drive according to FIG. 2;

DETAILED DESCRIPTION OF THE PREFERRED EMBODIMENTS

Figure 4:
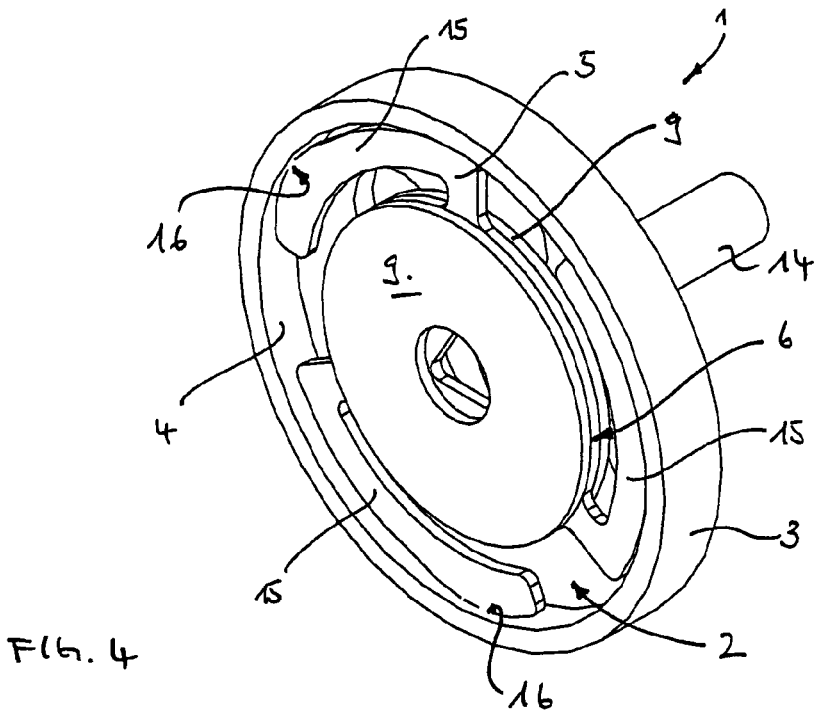
FIG. 4 shows a second embodiment of a piezoelectric drive.

FIG. 1 shows a first embodiment of a drive 1 according to the invention. The drive 1 comprises an inner part 2 and an outer part 3 with a cylindrical drive surface 4. The inner part comprises two oscillation elements (oscillation plates) 5.1, 5.2, which are arranged distanced to one another. The oscillation plates 5.1, 5.2 are designed to be planar and each comprise a middle part 6 about which the five arms 7 are arranged. The arms 7 serve as resonator regions. The arms 7 comprise spring regions 8 that connect the arms 7 to the middle part. The spring regions 8 serve for mounting and holding the resonator regions 7 with respect to the middle part 6. With the shown embodiment, the middle part 6, the resonator regions 7 and the spring regions 8 of each oscillation element 5.1, 5.2 are manufactured of sheet metal e.g. by punching, or cutting with a laser beam.

Between two distanced resonator regions 7 there are arranged rectangular piezoelements 9 which are stuck onto the resonator regions 7. The resonator regions 7 are designed in an essentially trapezoidal shape. In each case two opposite tips of each resonator region 7 comprise projecting horn elements 10 which are designed as interaction regions. The horn elements 10 are actively connected to the drive surface 4 of the outer part 3. The resonator regions 7 are designed and arranged such that when excited by the piezoelements 9, they execute a characteristic oscillation movement which is essentially equal to an ellipse. This characteristic movement is transmitted to the drive surface 4 by way of a frictional engagement in a manner such that the outer part 3 which here is formed as a ring 3 rotates about its axis.

In the center of each middle part 6 there may be recognized in each case one opening 11. These openings 11 serve for fastening the inner part 2 on a mounting (not shown in more detail). The fastening with respect to the mounting is designed in a manner such that negative vibrations are not transmitted.

FIG. 2 shows a front view of the drive according to FIG. 1. As may be recognized, each resonator region 7 here comprises several contact points 12 (for example for a rapid sequential drive movement) to the drive surface 4 of the outer part 3. Alternatively, it is also possible to design the resonator regions in a manner such that only one contact point 12 is present per resonator region 7. Arrows 13 schematically represent a characteristic movement of the contact points 12 as sets in at a frequency. With another frequency, the contact points 12 of the horns 10 execute another characteristic movement.

FIG. 3 shows a section along the line EE through the drive 1 according to FIG. 2. The piezoelements 9 are arranged between the resonator regions 7 of the oscillation plates 5. The annular outer part 3 surrounds the inner part 2. The annular outer part 3 is here guided and carried by the inner part. The drive surface may comprise additional axial guide means or may have an increased guiding effect due to its design so that the inner part has an improved guiding.

FIG. 4 shows a further embodiment form of a drive 1 according to the invention. The inner part 2 here consists of a plane oscillation plate with a round middle part 6 and three radially projecting arcuate arms 15. A piezeoelement is 9 arranged in each case on both sides of the round middle part 6. The piezoelements 9 are connected to the oscillation plate 5 by way of adhesive and serve for the excitation of this at both sides. The piezoelements 9 together with the oscillation plate 5 form a resonator 2. The resonator 2 has a mass distribution which is designed such that the oscillations of the arms 15 are suitable in order to drive the bell-shaped outer part 3. The arms 15 each have a projecting interaction region 16 which is actively connected to the drive surface 4 of the outer part 3. The bell-shaped outer part 3 comprises an arbor 14 which serves for transmitting the drive movement. The arbor 14 has its own mounting (not shown in more detail). By way of the three arms 15, the inner part 2 is self-centering with respect to the outer part 3 to be driven.

The arms 15 are arranged uniformly distributed about the middle part 6 in a radially projecting manner. In the region of their beginning, they comprise a sharp bend and towards their end merge into an arcuate shape which essentially follows the contour of the drive surface 14. The arms 15 are designed as spring elements and serve for transmitting and transforming the oscillations which are excited by way of the piezoelements. For this purpose, they each have an interaction region 16.

Figure 5:
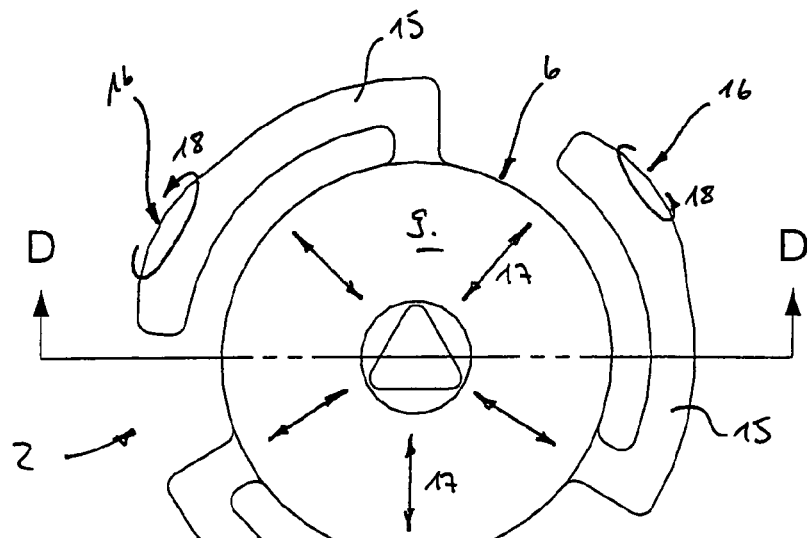
FIG. 5 shows a plan view of the piezoelectric drive according to FIG. 4.

FIG. 5 shows a front view of the inner part 2 of the drive 1 according to FIG. 4. The outer part 3 is not shown. The piezoelements 9 with the shown embodiment are designed such that they oscillate in an essentially radial direction (arrows 17). The oscillations of the piezoelements 9 are transmitted to the middle part 6 and by this onto the arms 15. The exciting oscillation is converted by the resonator 2 into a characteristic movement 18 which serves for driving the outer part 3.

Figure 6:
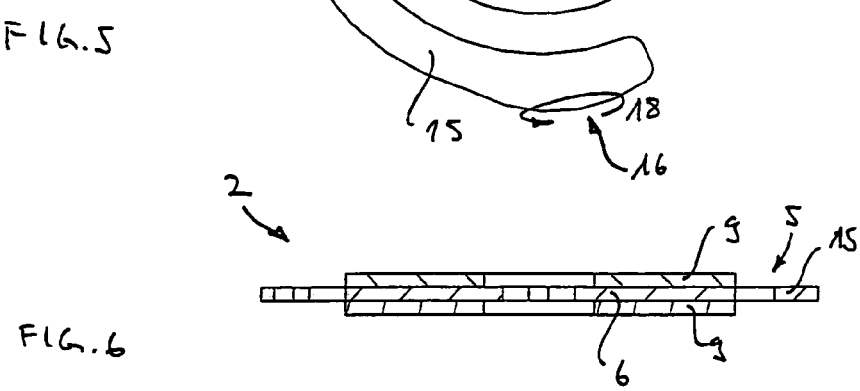
FIG. 6 shows a section through the piezoelectric drive according to FIG. 5.

FIG. 6 shows a section along the line DD according to FIG. 5. Piezoelements 9 are arranged on both sides of the oscillation plate 5.

Figure 7:
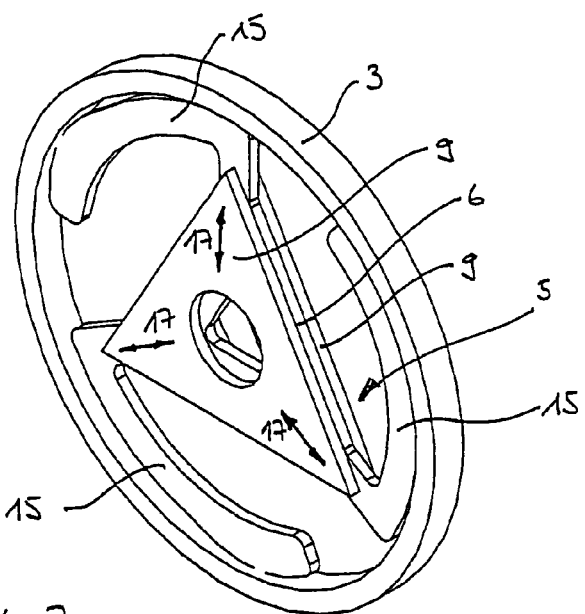
FIG. 7 shows a third embodiment of the piezoelectric drive.

FIG. 7 shows a further embodiment of a drive 1 according to the invention. This embodiment corresponds essentially to that of FIG. 4 with the difference that the middle part 6 is formed triangularly. The piezoelements 9 are likewise formed triangularly and are attached on both sides of the oscillation plate 5. Three sharp bended arms 15 are radially arranged in the corners of the middle part 6. The arms 15 in their end regions likewise each have an interaction region 16 which serves for driving an annular outer part 3. The rectangular shape of the middle part 6 and of the piezoelements 9 effect a reinforcement of the oscillation movements 17 towards the arms 15. This has a positive effect on the efficiency. The arms 15 are formed elastically. Together with the middle part 6, the arms 15 convert the oscillation of the piezoelemnts 9 into drive movements.

The pressing force of the inner part 2 with respect to the outer part 3 may be set by way of the alignment and the spring properties of the arms 15. With a steeper arrangement, the drive force acts much more perpendicularly to the surface 4 to be driven and, thus, effects a greater adhesion.

Figure 8:
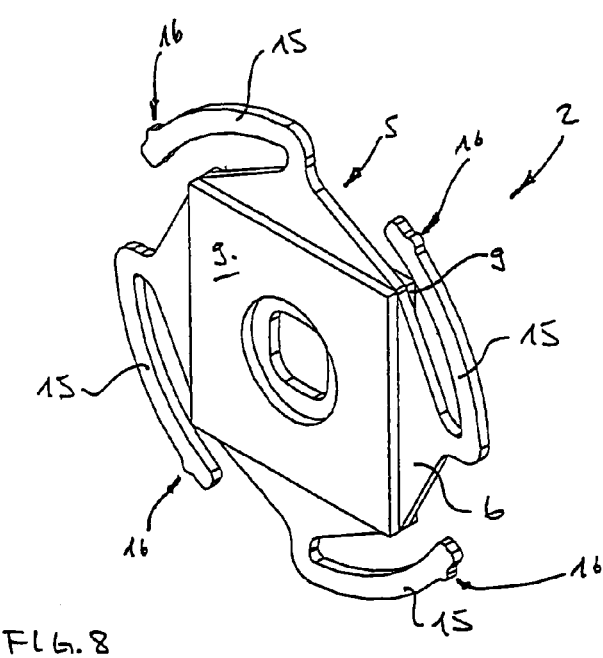
FIG. 8 shows a fourth embodiment of the piezoelectric drive.

FIG. 8 shows a further embodiment of an inner part 2 which is suitable for driving an outer part (not shown in more detail) with an outer surface. The inner part 2 here comprises a regular, octagonal middle part 6 on which an arm 15 is arranged at every second corner. A piezoelement 9 is attached in each case on both sides of the middle part 6. The piezoelements 9 are designed square and their corners correspond to the four free corners of the middle part 6. The oscillation element 5 and the piezoelements 9 together form a resonator. The arms 15 are designed as elastic springs which comprise projecting interaction regions 16 which serve for transmitting the drive movement onto an outer part (not shown in more detail). The resonator 2 is designed in a manner such that the drive movement lies essentially in the plane of the oscillation element 5. The middle part 6 comprises an essentially rectangular opening 11 which serves for the accommodation of a mounting (not shown in more detail). The mounting serves for mounting the inner part 2 and is designed such that the oscillations required for producing the drive movement are not negatively influenced.

With the embodiment of the drive 1 shown in the figures, it is possible to achieve an increase in the drive power in that further piezoelements and oscillation elements are unified into a stack. With such an arrangement a corresponding widening of the drive surface is required.

Figure 9:
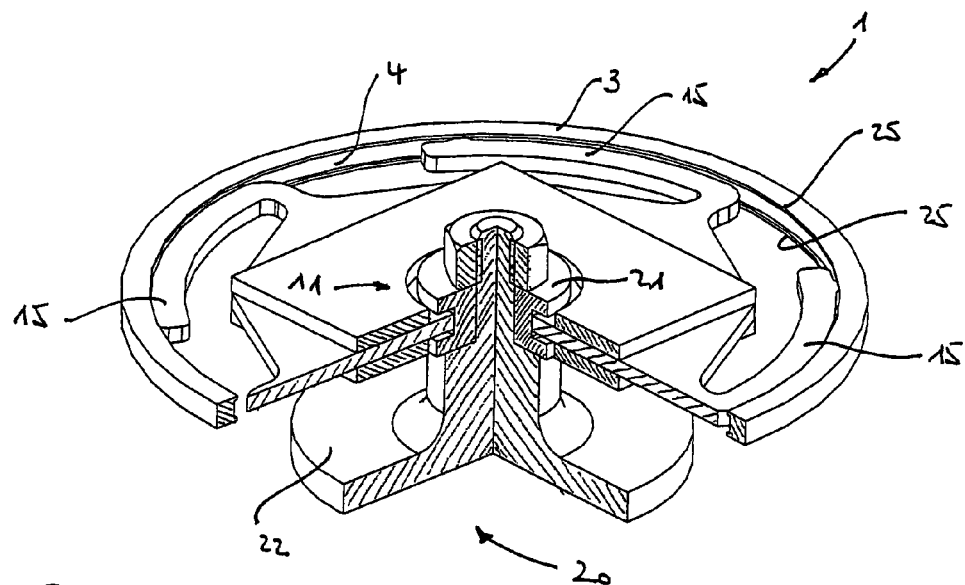
FIG. 9 shows a drive according to FIG. 8 with a floating mounting.

FIG. 9 shows the drive according to FIG. 8 in a sectioned representation. The drive 1 is shown assembled on a mounting 20 with a rubber element 21 and a base plate 22. The rubber element 21 is arranged in the opening 11 of the inner part 2 and is designed such that a rotation of the inner part 2 with respect to the mounting 20 is avoided. The rubber element 21 and with it the inner part 2 are fastened on the base plate 22 by way of a nut 23. The rubber element 21 is designed in a manner such that it acts in a decoupling manner such that no negative oscillation is transmitted to the base plate 21. It simultaneously serves for compensating any inaccuracies.

The drive surface 4 of the outer part 3 is limited on both sides by a projecting edge 25. The edge 25 serves as an axial guide and for limiting the arms 15.

Figure 10:
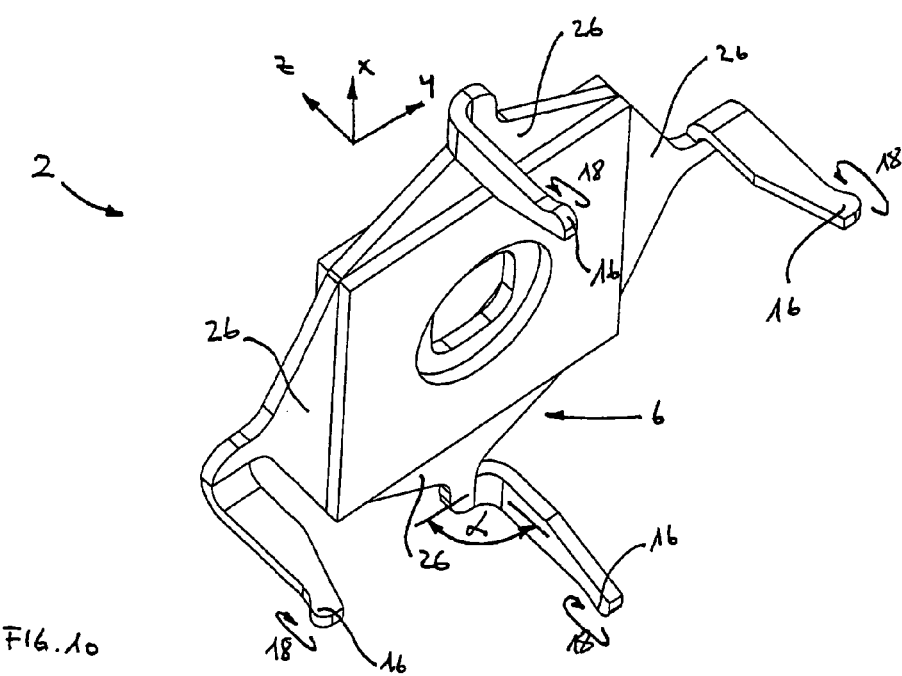
FIG. 10 shows a linear drive.

FIG. 10 shows a further embodiment of an inner part 2. The arms 15 of the inner part 2 are bent at an angle and project out of the plane of the middle part. The inner part 2 is designed such that the interaction regions 16 execute a characteristic movement 18 that permits a drive in the axial direction (Z-direction). The middle part 6 tapers towards the arms 15. These tapering regions 26 serve for concentrating the movement of the piezoelements 9. The arms 15 here are arranged at an angle α to the plane of the middle part 6, which corresponds essentially to 90°. An arrangement at another angle is possible in a manner such that a superposition of a rotational movement with an axial movement is achieved (spindle stroke drive). The arms 15 are formed elastically and serve for producing a pressing force on an outer part to be driven (not shown in more detail).

Figure 11:
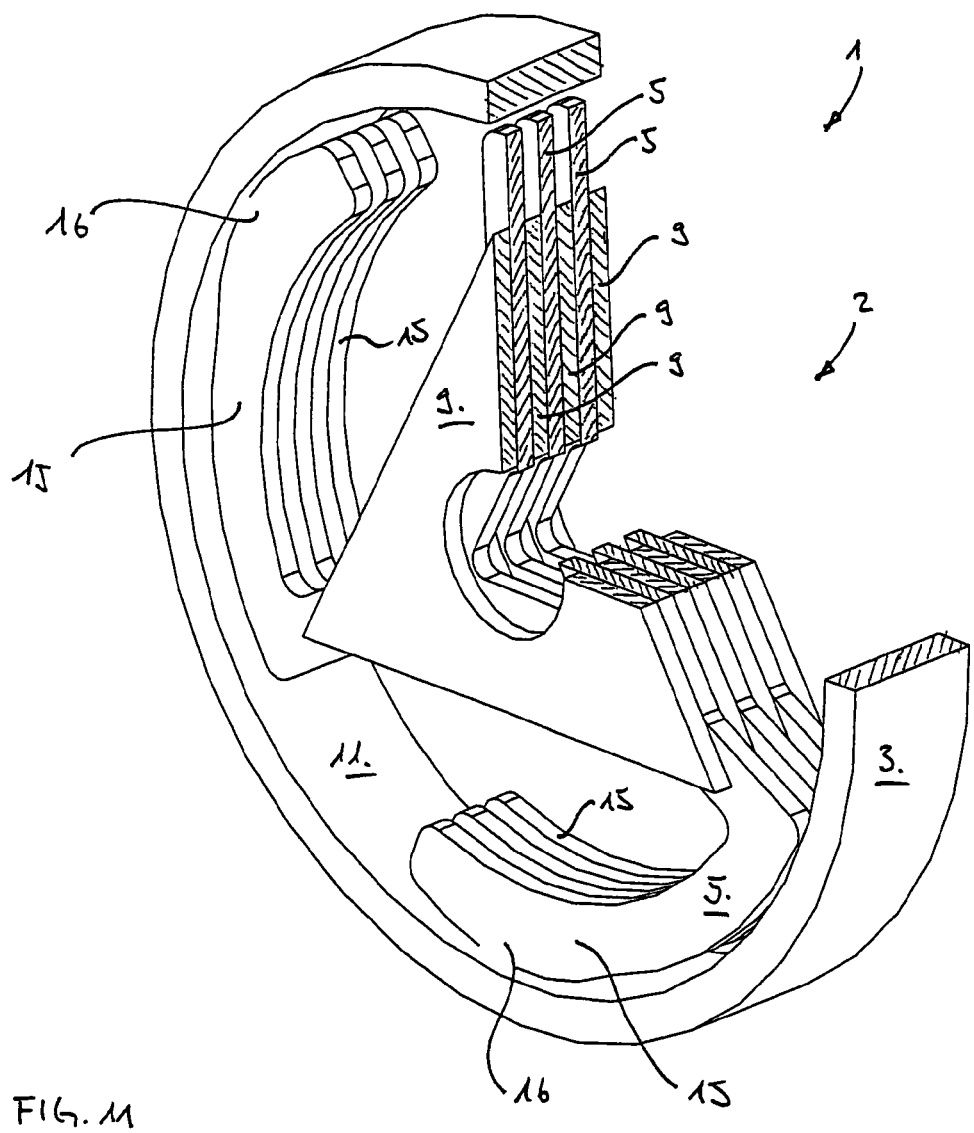
FIG. 11 shows a drive according to FIG. 7 in a sandwich arrangement.

FIG. 11 in a sectioned representation shows a drive 1 with an inner part 2 of several oscillation plates 5 and piezoelements 9 which are arranged behind one another. The inner part 2 drives an annular outer part 3. Interaction regions 16 of the arms are actively connected to a drive surface 11 of the outer part 3. As may be recognized, in each case, three arms 15 are arranged lying next to one another. Spacers may be arranged between the arms 15 lying next to one another in order to influence the oscillation behavior of the arms 15. The shown drive is distinguished by a large drive power with small dimensions. The arms simultaneously serve as cooling elements for leading away the arising heat. The drive may be operated mounted in a fluid.

Figure 12:
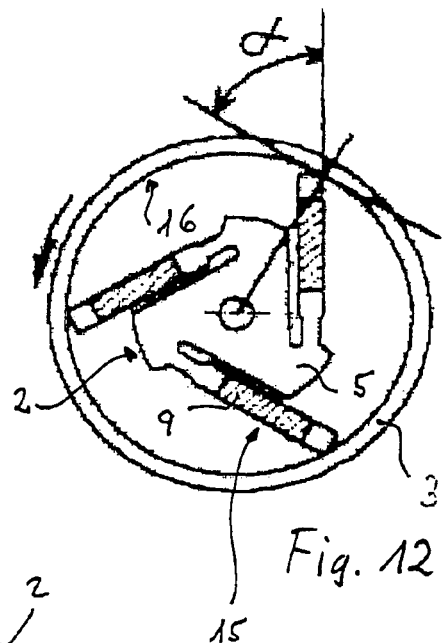
FIG. 12 shows a drive with which the resonators are arranged at a steep position to the tangential.

FIG. 12 shows an embodiment in which the resonators or arms 15 are at a "steep" position to the tangents of the drive. Due to this steep positioning of the arms 15, the advance drive becomes relatively low since the elliptical movement to the tangents of the inner surface of the outer runner is likewise "steep" (larger diameter of the ellipse to the tangent) and the surface pressing is relatively large, thus an increase in the drive force since the resilient suspension becomes relatively stiff due to the position. The connection of the resonators is not effected at the node point, but at the end of the resonator body or oscillation plate. This has the result that the frequency is halved and the coupling to the stator, or the inner part 2,5 (the fixed base so to speak) must be made in an extremely stiff manner. Due to this, however, there exists the risk of interference frequencies and losses in the residual body. The angle α is selected between 30 to 60 degrees.

Further drives according to the invention having a combination of the features of the described embodiments are to be deduced by the man skilled in the art.

The invention claimed is:

1. A piezoelectric drive (1) with an inner part (2) that is surrounded by an outer part (3) having an inwardly directed drive surface (4), wherein the inner part (2) comprises at least one piezoelement (9) that is actively connected to at least one oscillation element (5) and serves for exciting an oscillation (17), wherein the oscillation element (5) comprises a two-dimensional middle part (6), said middle part (6) being arranged essentially symmetrical to the drive (1) and being actively connected to the drive surface (4) via at least two symmetrically arranged interaction regions (16), said interaction regions (16) being designed to be set into oscillation by way of the at least one piezoelement (9) and drive the outer part (3) relative to the inner part (2), wherein at least two arms (7, 15) are arranged about the middle part (6) and are actively connected to the drive surface (4) via in each cases one of the interaction regions (16), the arms (15) act as spring elements and are preloaded with respect to the drive surface (4) by way of a spring effect provided thereby.

2. The drive according to claim 1, wherein the middle part (6) and the arms (15) arranged on the middle part are formed as one piece.

3. The drive according to claim 1, wherein at least portions of the arms (15) are arranged at an angle to the middle part (6).

4. The drive according to claim 1, wherein the arms (15) comprise a sharp bend.

5. The drive according to claim 1, wherein at least portions of the arms (15) run roughly tangentially to the drive surface (4) of the outer part (3).

6. The drive according to claim 1, wherein the inner part (2) is self-centering with respect to the outer part (3).

7. The drive according to claim 1, wherein the at least one oscillation element (5) is arranged between two piezoelements (9).

8. The drive according to claim 1, wherein the at least one piezolement (9) is arranged between two oscillation elements (5).

9. The drive according to claim 1, wherein the at least one piezolement (9) is arranged on the at least one arm (7) and wherein the at least one arm (7) is connected to the middle part (6) via a spring region (8) such that the arm functions as a resonator region (7).

10. The drive according to claim 1, wherein the at least one piezoelement (9) is two-dimensional and is arranged parallel to the middle part (6) rotationally symmetrically and perpendicular to a rotation axis of the drive (1), and wherein at least one piezoelement (9) is designed for oscillation in the radial direction.

11. The drive according to claim 1, wherein the arm has more than two active connections to the outer part (3).

12. The drive according to claim 1, wherein a modulus of elasticity (E-module) of the sheet metal and of the piezoelement, or the thickness of the sheet metal and the piezoelement is selected such that a formula $$E\text{-module}_{sheet\ metal} * thickness_{sheet\ metal} = E\text{-module}_{piezoelement} * thickness_{piezoelement}$$

is fulfilled as much as possible.

* * * * *

UNITED STATES PATENT AND TRADEMARK OFFICE
CERTIFICATE OF CORRECTION

| | | |
|---|---|---|
| PATENT NO. | : 7,075,212 B2 | Page 1 of 1 |
| APPLICATION NO. | : 10/493135 | |
| DATED | : July 11, 2006 | |
| INVENTOR(S) | : Witteveen | |

It is certified that error appears in the above-identified patent and that said Letters Patent is hereby corrected as shown below:

Column 10, Line 13 (Claim 1, Line 15), after "via", insert --,--.

Column 10, Line 14, (Claim 1, Line 16), delete "cases", and insert --case,--.

Signed and Sealed this

Nineteenth Day of September, 2006

JON W. DUDAS
*Director of the United States Patent and Trademark Office*